United States Patent Office 3,510,631
Patented May 5, 1970

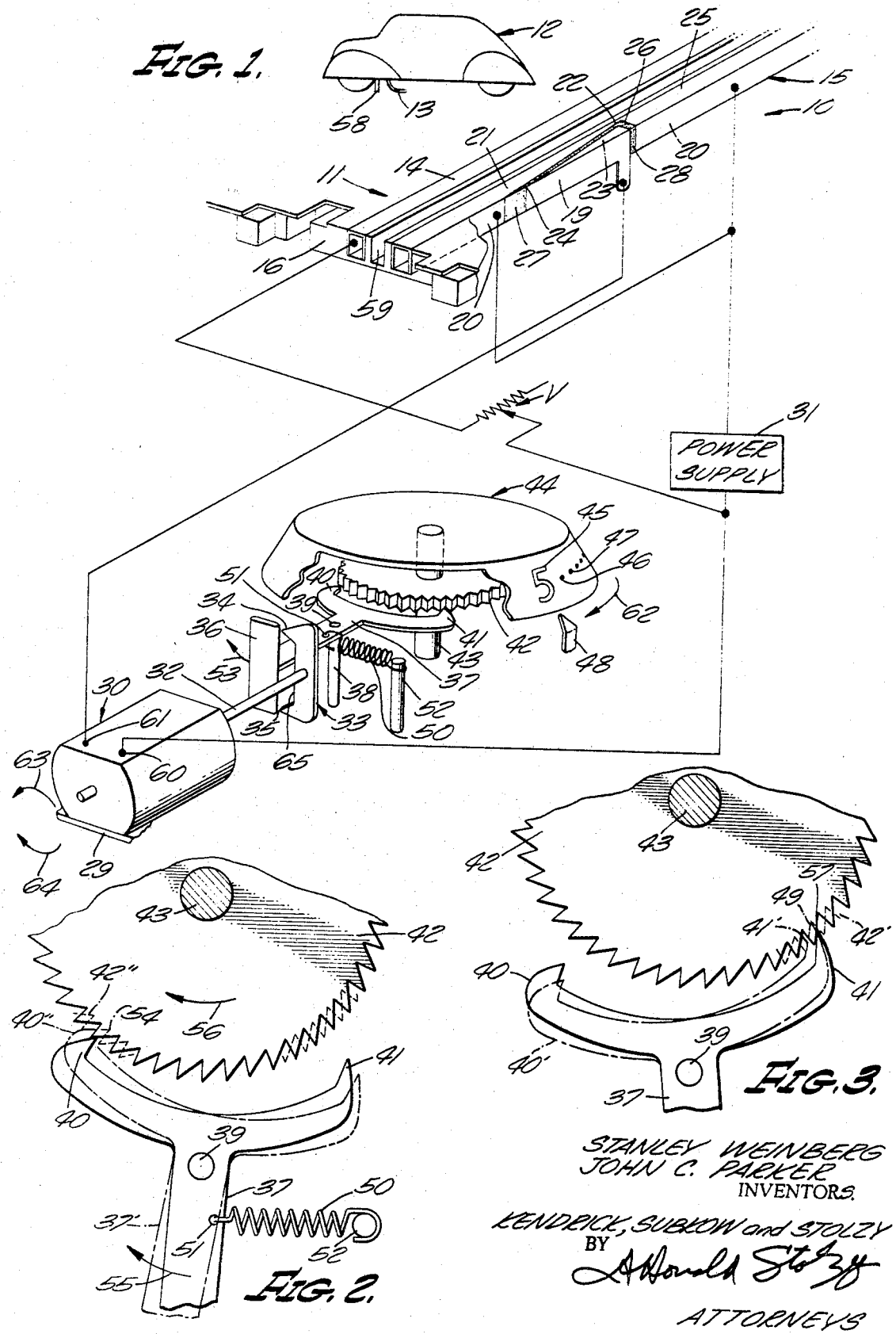

3,510,631
LAP COUNTER
Stanley Weinberg and John C. Parker, Los Angeles County, Calif., assignors to Revell, Inc., Venice, Calif., a corporation of California
Filed June 15, 1966, Ser. No. 557,833
Int. Cl. B61l 1/16
U.S. Cl. 235—92        10 Claims

ABSTRACT OF THE DISCLOSURE

Toy cars including electric motors are driven along conductive tracks under the selective control of variable resistors manipulated by the players. A portion of each track includes a spaced conductor which is shorted to the track by a car brush as it moves therepast, forming a switch. Each of the switches is interconnected in a circuit to a motor which actuates a cam and cam follower arrangement for indexing a wheel carrying lap number information on its periphery. As a car makes a full lap and temporarily closes the switch, the motor effects indexing to indicate the number of laps accomplished.

---

This invention relates to model racing apparatus, and more particularly to a reliable and accurate, yet inexpensive, device for indicating the number of times that a car has traveled around the track of a model road race set.

In the past, it has been the practice to use a ratchet wheel with a pawl for a model road race lap counter. In such a case the pawl is operated by a solenoid which is energized through a switch at trackside.

Solenoid operated lap counters of the prior art suffer from several serious disadvantages. They are slow, unreliable, inaccurate and expensive. They are slow because the solenoid core or armature which moves the pawl moves very slowly. Slow movement is produced for several reasons. The inertia of the core is, of course, the basic cause. However, the magnetic force on the core, once the solenoid is energized, is the least when the core first begins to move. This is due to the fact that the magnitude of the magnetic force acting on the core is the least when the magnetic circuit is the farthest open. In other words, when the core has moved to its extreme limit of travel while the solenoid is energized, the core has the greatest force upon it. However, this is of no assistance in accelerating the core because the core is then at rest at the end or limit of its travel. Moreover, the magnetic force on the core varies inversely with the square of the distance that the core moves. That is, the force drops off, not linearly, but very rapidly and in accordance with the second power of distance.

In the past it has also been the practice to employ a direct-current power supply to energize a lap counter solenoid. A polarity sensitive capacitor has also been required in the circuit. It therefore has been necessary to connect such prior art lap counters with the correct polarity. However, many road race sets are operated by small children and the children frequently, and sometimes adults as well, connect such lap counters with the wrong polarity. As a result, the capacitor burns out and is wholly destroyed.

In conventional road race sets a model car is propelled around a race track by an electric motor inside the car. A pair of conductive rails around the track are electrified to supply power to the car. The car is provided with two brushes, one connected to each side of the motor. One brush contacts one rail and the other brush the other rail.

Even though the car is electrically powered, it is not uncommon to operate the electric switch of a conventional lap counter by some contrivance which is actuated mechanically and not electrically by the model race car as it passes a certain point around the track.

It is conventional to control the power to a model race car by controlling the current supplied to the rails by means of a series variable resistance. It frequently happens that control of a car is lost when conventional lap counters are employed, due to the use of an electrically isolated rail section.

In accordance with the device of the present invention, the above-described and other disadvantages of the prior art are overcome by providing a conventional direct-current shunt type electric motor having a rotor to advance a model road race lap counted. This arrangement has several outstanding advantages over those of the prior art.

In the first place, the direct-current motor operates at a speed far in excess of that at which conventional solenoid actuated lap counters operate. Yet a small direct-current motor is less expensive. The lap counter of the present invention is also more reliable and accurate than those of the prior art because of the motor and for other reasons to be explained hereinafter.

Unlike the slow prior art lap counters, the lap counter of the present invention operates very rapidly because of the low rotor inertia of the motor and the precision and low friction mount of the rotor in bearings.

It is also an outstanding advantage of the present invention that the output torque of the motor varies little with rotor position and is a maximum when the rotor is at rest in any position. This means that a lap counter pawl operated by the motor is accelerated rapidly with a large force to a high speed. Further, maximum torque is developed when the rotor is stationary in both of its extreme limits of travel.

In accordance with another outstanding feature of the present invention, the lap counter is advanced in a step-by-step fashion by the motor, but the counter is always advanced in the same direction regardless of the polarity of the motor excitation voltage. Note will be taken that a direct-current motor reverses its direction of rotation when the polarity of its excitation voltage is reversed. However, in accordance with the present invention, this reversal does not make the lap counter run backwards or malfunction.

Further, by using the motor of the present invention, the use of a capacitor is not required as it was with prior art solenoid actuators. There is thus no risk of capacitor destruction.

Another feature of the present invention resides in the use of a specially made switch in one of the track rails to energize the lap counter motor. One track rail is notched and an intermediate rail section is placed in a position within but insulated from the notched rail. The intermediate section is then connected electrically to the lap counter motor to energize it when one of the model car brushes electrically connects the notched rail to the intermediate rail section. Since the notched rail is electrically continuous, control of the race car is thus never lost.

Still another feature of the invention resides in the use of a triangular intermediate rail section. This makes it possible to insure a count for each lap actually made by a car even though one of its brushes touches only a small portion of the notched rail.

The above-described and other advantages of the present invention will be better understood from the following description when considered in connection with the accompanying drawings.

In the drawings which are to be regarded as merely illustrative:

FIG. 1 is a perspective view of a model road race lap counter constructed in accordance with the present invention; and FIG. 2 and FIG. 3 are enlarged operational views of a portion of the counter shown in FIG. 1.

In the drawing in FIG. 1, a road race set is indicated at 10. A portion of a race track is indicated at 11. The race track has means to accommodate two cars running side by side. One car is indicated at 12. Car 12 may be entirely conventional. Car 12 always has a pair of brushes 13. One brush 13 engages one rail 14. One brush engages a rail 15.

Rails 14 and 15 are conductive. Rails 14 and 15 are mounted in a fixed position in a molded plastic part 16. A portion 17 of rail 15 acts as a switch for the lap counter of the present invention. Rail 15 has two sections 19 and 20. Both sections 19 and 20 are made of a conductive metal. Section 20 has a top surface 21 which is tapered to a minimum width at 22. Intermediate section 19 has a top surface 23 which is tapered to a point 24. Rail 15 has a top surface 25 which is notched to accommodate the intermediate rail section 19.

Intermediate rail section 19 is disposed within the notch in rail section 20. However, intermediate rail section 19 is insulated from rail section 20. Note will be taken that the taper of rail surface 21 is parallel with the taper of rail surface 23.

If desired, intermediate rail section 19 may be insulated from rail section 20 by plastic at 27 and 28.

The lap counter of the present invention may be mounted on a base structure indicated at 29. This is true of all the component parts of the lap counter of the present invention to be described hereinafter.

The lap counter is actuated through a direct-current shunt type electric motor 30. Motor 30 is operated by a power supply 31. The electrical connections of the structures heretofor described are as follows. One side of power supply 31 is connected to rail section 20. The other side of power supply 31 is connected to rail 14 through a variable resistance V, and to one side of motor 30. The other side of motor 30 is connected to intermediate rail section 19.

Motor 30 has an output shaft 32 to which a cam 33 is fixed. Cam 33 has a pair of points 34 and 35 which operate a follower 36. Follower 36 is fixed to an arm 37 that is pivoted about a post 38 at 39. Arm 37 has a pair of pawls 40 and 41 integral therewith.

Pawls 40 and 41 operate a ratchet wheel 42. Ratchet wheel 42 is fixed to a shaft 43 that rotates on base 29 with wheel 42.

An indicator disc 44 is also fixed to shaft 43. Disc 44 has indicia at 45, 46 and 47 to indicate the number of laps that a model car has made around track 11. The number of laps so made may be determined by comparing the position of the indicia with an index 48 which is fixed to base 29.

Pawls 40 and 41 are normally biased, with motor 30 de-energized, in the position shown in dotted lines at 40' and 41' in FIG. 3. The same is true of the dotted line position of ratchet wheel 42 shown at 42' in FIG. 3. In this position, note will be taken that the extreme end or point of pawl 41 lies at the bottom of a notch between teeth at 49 in FIG. 3.

Pawls 40 and 41 are normally biased to this position by a spring 50 which has one end that extends through a hole 51 in arm 37, and another end which extends around a post 52 fixed to base 29.

When motor 30 is energized, follower 36 is pushed in the direction of arrow 53 as shown in FIG. 1. This moves arm 37 to the position as shown in solid lines in FIG. 2. Before ratchet wheel 42 has moved, and when pawl 40 first contacts a tooth of ratchet wheel 42, pawl 40 will be in the solid line position shown in FIG. 2. However, upon the continued energization of motor 30, ratchet wheel 42 will be moved to the position shown in dotted lines at 42" in FIG. 2. In this position, the extreme point of pawl 40 will lie at the bottom of a groove between ratchet teeth at 54 shown in FIG. 2. In that position, arm 37 will move to the dotted line position shown at 37'. Arm 37 will thus move in the direction of arrow 55. Ratchet wheel 42 will move in the direction of arrow 56.

Once motor 30 is de-energized, spring 50 will return pawl 41 to the position shown in solid lines in FIG. 3. At this position, the extreme point of pawl 41 at 57 will not lie at the bottom of a groove between teeth of ratchet wheel 42. However, the action of spring 50 will continue to urge point 57 to the bottom of such a groove, and ratchet wheel 42 will then move to the dotted line position shown at 42' in FIG. 3 from the solid line position shown at 42 therein. When pawls 40 and 41 are in the solid line position shown in FIG. 3, ratchet wheel 42 will be in the solid line position shown in FIG. 3.

As explained previously, both at the beginning and at the end of the rotational travel of motor shaft 32, motor 30 delivers a maximum output torque. This is true because the speed of shaft 32 in both of its limits of travel is zero. Use is made of this special operating characteristic of motor 30 to store the energy supplied thereby in spring 50. In particular, ratchet wheel 42 is moved farther by pawl 41 through the action of spring 50 than it is moved by pawl 40 through the direct action of motor 30 in the rotation of cam 33 with shaft 32.

In the operation of the lap counter of the present invention, car 12 runs on track 11. As is conventional, car 12 has a projection 58 which guides car 12 around track 11 in a groove 59 therein. At the same time, one of the brushes 13 engages one of the rails 14 and the other brush 13 engages the other rail 15. Once the brush 13 which engages rail 15 touches both surfaces 21 and 23 of rail sections 20 and 19, power is supplied to both sides of motor 30. Power is supplied to one side of motor 30 directly by power supply 31 at 60. Power is supplied to the other side of motor 30 at 61 by the connection from power supply 31 through notched rail section 20, through car brush 13, and through rail section 19.

When motor 30 is thus energized, shaft 32 will rotate. One of the points 34 or 35 then will move follower 36 in the direction of arrow 53. This will move pawl 40 from the solid line position to the dotted line position shown in FIG. 2. When brush 13 leaves rail section 19, motor 30 will then be de-energized and pawl 41 will be moved from the solid line position shown in FIG. 3 to the dotted line position shown therein. Disc 44 will then register one additional lap.

Note will be taken that ratchet wheel 42 and disc 44 will advance together in the direction of arrow 62 shown in FIG. 1. Note will be taken that ratchet wheel 42 and disc 44 will advance in direction 62 regardless of the direction of rotation of motor 32. In other words, motor shaft 32 may turn in the directions indicated at 63 or 64 in FIG. 1. Motor shaft 32 will in fact turn in a direction dependent upon the polarity of the output of power supply 31, power supply 31 being a direct-current power supply. Each time motor shaft 32 turns in the direction of arrow 63, cam point 34 will bear against follower 36. Alternatively, if motor shaft 32 turns in the direction of arrow 64, cam point 35 will engage follower 36.

Although disc 44 is used as an indicator, note will be taken that, without departing from the invention, the positions of disc 44 and index 48 may be reversed. In other words, these component parts of the invention may be transposed without departing from the invention. Disc 44 or some other type of indicator may be fixed to base 29 and index 48 or some other kind of index may be fixed to shaft 43. Further, the word "indicator" is defined for use in this description and in the claims to follow to mean disc 44 or index 48 or any other equivalent thereof.

Although reference is made hereinbefore to portions 34 and 35 of cam 33 as "cam points," note will be taken that the points of these cams need not be extremely sharp. For example, as shown in FIG. 1, it appears that a trapezoidal portion 65 of cam 33 appears to have been cut away to make points 34 and 35 sharp. However, the portion which appears to be cut away at 65 need not, in fact, be cut away. Further, the phrase "cam points" is hereby defined to include the points of the cam regardless of whether or not that portion of the cam indicated at 65 is in fact cut away. This definition is set forth herein to apply to the phrase "cam points" as used both in this description and the following claims. Furthermore, were a portion of cam 33 replaced at 65, this portion of the cam need not be absolutely flat or smooth.

Note will be taken that some of the features of the present invention may be employed without using other features of the invention. For example, motor 30 may be employed with entirely different and conventional switch means at 17. Motor 30 may also be employed in a lap counter which is otherwise conventional.

The construction of cam 33 and follower 36 or an equivalent thereof to advance ratchet wheel 42 in direction 62 independent of the direction of rotation of motor shaft 32 may be employed independent of switch means 17 or of the construction of motor 30. A switch means at 17 may be employed independent of all the other structures of the present invention disclosed herein.

Further, the arrangement of ratchet wheel 42 as shown in FIGS. 2 and 3 to be moved by the action of spring 50 than by the energization of motor 30 may be employed independent of the other structures of the invention disclosed herein.

Due to the fact that some of the features of the invention may be employed independent of motor 30, the phrase "electrical actuator" is hereby defined for use in this description and in the claims to follow to include both motor 30 and any conventional solenoid or other type of electrical actuator.

From the foregoing, it will be appreciated that motor 30 can operate at a speed far in excess of that at which conventional solenoid actuated lap counters can operate. Motor 30, however, is inexpensive. Motor 30 is very reliable and accurately advances indicator disc 44 past index 48. One reason that motor 30 operates rapidly is because it has a low rotor moment of inertia. Further, prior art solenoid cores are not mounted for precision movement. On the contrary, the rotor of motor 30, as is conventional, is mounted for more or less precision movement in low friction bearings. Even though such movement is precisely controlled and in bearings, this mounting means is inexpensive.

Further, motor 30 has an output torque which varies little with the angular position of shaft 32. The output torque of motor 30 is also near a maximum at all times because shaft 32 does not move but a few degrees and much less than 360° to bring pawl 40 fully to the dotted line position indicated at 40″ shown in FIG. 2. As stated previously, the torque of motor 30 is in fact a maximum when shaft 30 is in either one of its extreme limits of travel, because the velocity of rotation of shaft 32 in each such case is zero. Furthermore, the velocity of shaft 32 is also zero in its rest position shown in FIG. 1. Spring 50 in fact returns shaft 30 to the position shown in FIG. 1 each time motor 30 is de-energized because spring 50 urges follower 36 in a direction opposite to arrow 53 against a corresponding one of cam points 34 and 35.

For use herein, the phrase "extreme limit of travel" as applied to the movement of shaft 32 or to cam 33 or any part thereof is hereby defined to include the position of shaft 32 shown in FIG. 1 and the position of shaft 32 when rotated in the direction of arrow 63 or arrow 64, with pawl 40 in the dotted line position shown at 40″ in FIG. 2.

Due to the high torque operation of motor 30, ratchet wheel 42 is advanced rapidly even though car 12 may pass over switch means 17 at a high rate of speed.

It is also an outstanding feature of the invention that the arrangement of cam 33 with follower 36 makes the advance of ratchet wheel 42 in the direction of arrow 62 independent of the direction of rotation of shaft 32. This means that regardless of how either a child or an adult may connect direct-current power supply 31, its particular polarity will not affect efficient operation of the lap counter of the present invention.

Further, due to the high power and high torque and high speed of response of the motor 30, a capacitor is not required to energize it.

Note will be taken that notched rail section 20 is electrically continuous throughout its length. Control of race car 12 is therefore never lost as it passes over switch means 17.

Further, the use of the tapered portions of rail surfaces 21 and 23 makes it possible to insure good contact between a corresponding car brush 13 and both surfaces 21 and 23, regardless of where the corresponding brush 13 contacts rail 15 across the width of either one of the surfaces 21 and 23. Accurate operation of the lap counter of the present invention is therefore assured. The lap counter is positively actuated and the count of any particular lap always made.

Although only one specific embodiment of the present invention has been described and illustrated herein, many changes and modifications will of course suggest themselves to those skilled in the art. This single embodiment has been selected for this disclosure for the purpose of illustration only. The present invention should therefore not be limited to the embodiment so selected, the true scope of the invention being defined only in the appended claims.

What is claimed is:

1. In a model road race lap counter, the combination comprising: a race track having two electric rails for model race cars; a ratchet mechanism including a ratchet wheel, said wheel having a set of teeth therearound; a lap indicator fixed to said wheel; a main pawl movable to engage each of said teeth successively and advance said wheel means to bias said pawl to urge it to stay in one position; a direct-current electric motor having a shaft rotatable to move said main pawl; and a switch at said track actuable by movement of a race car therearound to energize said motor; said ratchet mechanism further including connection means responsive to rotation of said shaft in either direction about its axis to move said main pawl in a direction to advance said ratchet wheel in only one predetermined direction independent of the direction of rotation of said shaft.

2. The invention as defined in claim 1, wherein said connection means includes a pair of spaced, cam points fixed to said motor output shaft and a follower for said points fixed to said main pawl.

3. The invention as defined in claim 2, wherein said main pawl is pivoted about a predetermined axis perpendicular to a first plane through the axis of said motor output shaft, wherein said follower has a follower surface in a second plane parallel to both said predetermined axis and the axis of said motor output shaft, said cam points being pointed toward said second plane on opposite sides of a third plane through said shaft axis perpendicular to said second plane.

4. In a model road race lap counter, the combination comprising: a race track having two electric rails for model race cars; a ratchet mechanism including a ratchet wheel, said wheel having a set of teeth therearound; a lap indicator fixed to said wheel; a main pawl movable to engage each of said teeth successively and advance said wheel means to bias said pawl to urge it to stay in one position; a direct-current electric motor to move said main pawl; and a switch at said track actuable by movement of a race car therearound to energize said motor wherein one of said track rails has a triangular notch therein, said notched rail having a triangular rail section in said notch but insulated from said notched rail.

5. In a model road race lap counter including a ratchet wheel, an indicator fixed to said wheel, a pawl movable to advance said wheel in steps, said pawl being spring biased, the combination comprising: a direct-current electric motor having an output shaft with a predetermined axis of rotation; cam means fixed to said shaft; and a follower engageable by said cam means and fixed to said pawl to move said pawl with said follower as said follower is moved by said cam means, wherein said cam means includes a pair of spaced cam points, said follower being movable towards and away from said cam points, and the apexes of said points are disposed equal distances from said motor shaft axis in a plane perpendicular thereto, the apexes of said points being disposed equal distances from and on opposite sides of a first plane extending through said shaft axis in the direction of movement of said follower, said follower having a flat surface to engage said points, said flat surface being in a second plane approximately perpendicular to said first plane.

6. In a model road race lap counter, the combination comprising: a base; a ratchet wheel having a set of teeth, said wheel being rotatably mounted on said base; an indicator fixed to said wheel; a pawl movable on said base successively into and out of engagement with each of said wheel teeth to advance said wheel in steps; a spring mounted on said base to urge said pawl out of engagement with said wheel teeth; a direct-current electric motor mounted on said base, said motor having an output shaft with a predetermined axis of rotation; a cam having a pair of spaced points, said cam being fixed to said shaft; a follower engageable by said cam and fixed to said pawl to move said pawl with said follower as said follower is moved by said cam, said follower being mounted on said base to move toward and away from said cam points, the apexes of said points being disposed equal distances from said motor shaft axis in a plane perpendicular thereto, the apexes of said points being disposed equal distances from and on opposite sides of a first plane extending through said shaft axis in the direction of movement of said follower, said follower having a flat surface to engage said points, said flat surface being in a second plane approximately perpendicular to said first plane; and means to energize said motor.

7. In a road race for model cars each having a pair of electrical brushes, and having a counter including an electrical actuator, switch apparatus for energizing said actuator, said apparatus comprising: a pair of conductive rails to be contacted by said car brushes, one of said rails having first and second sections, said first section having its horizontal surface notched, one end of said notch being tapered toward a position at one side thereof, said second section also having a horizontal surface at one end tapered to a point at one side thereof, said first and second sections being fixed relative to each other in positions such that the said tapered edges thereof are maintained in spaced and approximately parallel relation, each of said sections being electrically insulated from the other one thereof; and a direct-current supply having one terminal connected to said first rail section, and another terminal connected to said second rail section and one side of said actuator, said second rail section being connected to the other side of said electrical actuator; whereby electrical power from the direct-current supply is provided to the actuator as a car brush contacts both the first and second rail sections simultaneously as a car passes thereover.

8. In a road race set, the combination comprising: a race track; a car to run on said track; a pair of conductive rails for said track, said car having a brush to contact each rail, one of said rails having first and second sections, said first section having a notch therein, said second section being positioned within said notch in said first section and sufficiently close to said first section to permit one of said brushes to touch both of said first and second sections simultaneously to make electrical contact therebetween; means to indicate the number of laps said car makes around said track including an electrical actuator having two input terminals; and a power supply having two output terminals, one of said output terminals being connected to said first section, the other of said output terminals being connected to the other of said rails and to one of said actuator input terminals, the other of said actuator input terminals being connected to said second rail section.

9. In a model road race counter including a lap indicator, a ratchet wheel fixed relative to said indicator, a pawl movable to engage said ratchet wheel, an arm fixed to said pawl, said arm being movable in a predetermined direction to advance said ratchet wheel, and a direct-current electric motor having an output shaft rotatable in either one of the directions about its axis, the combination comprising: a follower fixed to said arm; a cam fixed to said shaft in a position to engage said follower, said cam having two peak points to move said follower and to cause said arm to move only in said predetermined direction when said shaft rotates in either one of the directions about its axis, said peak points being spaced the same radial distance from the axis of said shaft, said cam having a shape to allow said peak points to contact said follower simultaneously when said shaft is in a predetermined position; and means to bias said pawl away from said ratchet wheel and said follower toward said cam to urge said shaft to assume said predetermined position thereof.

10. The invention as defined in claim 9, wherein said bias means is a spring.

References Cited

UNITED STATES PATENTS

| | | | |
|---|---|---|---|
| 3,400,667 | 9/1968 | Case et al. | 235—92 |
| 987,273 | 3/1911 | Wardwell | 235—92 |
| 1,993,527 | 3/1935 | Mears | 73—167 |

MAYNARD R. WILBUR, Primary Examiner

R. F. GNUSE, Assistant Examiner

U.S. Cl. X.R.

104—150; 340—379